United States Patent
Huang et al.

(10) Patent No.: US 8,140,664 B2
(45) Date of Patent: Mar. 20, 2012

(54) GRAPHICAL USER INTERFACE BASED SENSITIVE INFORMATION AND INTERNAL INFORMATION VULNERABILITY MANAGEMENT SYSTEM

(75) Inventors: Shu Huang, San Jose, CA (US); Fei Huang, Fremont, CA (US); Liwei Ren, Sunnyvale, CA (US); Aiguo Dong, Mountain View, CA (US)

(73) Assignee: Trend Micro Incorporated, Tokyo (JP)

( * ) Notice: Subject to any disclaimer, the term of this patent is extended or adjusted under 35 U.S.C. 154(b) by 879 days.

(21) Appl. No.: 11/431,799

(22) Filed: May 9, 2006

(65) Prior Publication Data

US 2006/0272024 A1 Nov. 30, 2006

Related U.S. Application Data

(60) Provisional application No. 60/679,459, filed on May 9, 2005.

(51) Int. Cl.
*H04L 9/00* (2006.01)
*G06F 12/14* (2006.01)
(52) U.S. Cl. ............... 709/224; 726/22; 713/156
(58) Field of Classification Search .......... 709/223–226
See application file for complete search history.

(56) References Cited

U.S. PATENT DOCUMENTS

| | | | |
|---|---|---|---|
| 5,394,522 A * | 2/1995 | Sanchez-Frank et al. | 715/735 |
| 5,535,403 A * | 7/1996 | Li et al. | 715/853 |
| 6,493,709 B1 | 12/2002 | Aiken | |
| 6,584,470 B2 | 6/2003 | Veale | |
| 7,031,972 B2 | 4/2006 | Ren et al. | |
| 2002/0019945 A1* | 2/2002 | Houston et al. | 713/201 |
| 2003/0172066 A1 | 9/2003 | Cooper et al. | |
| 2004/0167921 A1* | 8/2004 | Carson et al. | 707/102 |
| 2005/0060537 A1* | 3/2005 | Stamos et al. | 713/156 |
| 2006/0048224 A1* | 3/2006 | Duncan et al. | 726/22 |

OTHER PUBLICATIONS

PCT International Search Report and Written Opinion, PCT/US06/17846, Oct. 18, 2006, 11 Pages.
Anagnostopoulos. A. et al., "Sampling Search-Engine Results," Proceedings of the 14th International Conference on World Wide Web, WWW 2005, May 10-14, 2005, pp. 245-256, Chiba, Japan.
Chen, J. et al., "Knowledge Discovery and Data Mining Based on Power Plant Real-Time Database: A Survey," Proceedings of International Conference on Power Engineering, Oct. 8-12, 2001, pp. 1-5, Xi'an, China.
Chen, L. et al., "Template Detection for Large Scale Search Engines," SAC '06, Apr. 23-27, 2006, 5 pages, Dijon, France.
Hamilton, N., "The Mechanics of a Deep Net Metasearch Engine," Proceedings of the 12th International World Wide Web Conference, 2003, 2 pages.
Jessop, M. et al., "Pattern Matching Against Distributed Datasets," 6 pages, UK e-Science 2004.

(Continued)

*Primary Examiner* — Ian N Moore
*Assistant Examiner* — Thai Nguyen
(74) *Attorney, Agent, or Firm* — Okamoto & Benedicto LLP

(57) ABSTRACT

A system and method provides a graphical user interface (GUI) for users to monitor and manage sensitive information within an enterprise network. The GUI can provide users with information, such as the presence of input/output devices (I/O device), the location of documents containing sensitive information (sensitive documents), and the status of local security policy. The GUI can also provide users with real-time information, such as the occurrence of local security policy violations, the life-cycle of sensitive documents, and the sensitive information dynamic flow within the enterprise network.

14 Claims, 9 Drawing Sheets

OTHER PUBLICATIONS

Lai, W. C. et al., "An Anatomy of a Large-Scale Image Search Engine," IEEE MSE, Dec. 2002, 4 pages, Irvine.

Lavrenko, V. et al., "Relevance Models for Topic Detection and Tracking," 6 pages, Human Language Technology Research, 2002.

Pallickara, S. et al., "Incorporating an XML Matching Engine in Distributed Brokering Systems," Proceedings of the International Conference on Parallel and Distributed Processing Techniques and Applications, (PDPTA'03), 2003, pp. 1-7.

* cited by examiner

GRAPHICAL USER INTERFACE BASED SENSITIVE INFORMATION AND INTERNAL INFORMATION VULNERABILITY MANAGEMENT SYSTEM

CROSS-REFERENCE TO RELATED APPLICATION(S)

This application claims a benefit of, and priority under 35 U.S.C. §119(e) to, U.S. Provisional Patent Application Ser. No. 60/679,459, "Graphical User Interface Based Sensitive Information and Internal Information Vulnerability Management System," filed on May 9, 2005, which is hereby incorporated by reference.

This application relates to U.S. patent application Ser. No. 11/413,754, "Cascading Security Architecture," filed on Apr. 27, 2006 this application also relates to U.S. patent application Ser. No. 11/361,447, "Matching Engine For Querying Relevant Documents," filed on Feb. 24, 2006; and this application also relates to U.S. patent application Ser. No. 11/361,340, "Matching Engine With Signature Generation," filed on Feb. 24, 2006. The subject matter of each is incorporated herein by reference.

BACKGROUND

1. Field of the Invention

The present invention generally relates to the field of information management technology, and more specifically, to the field of enterprise document management for protecting sensitive information.

2. Description of the Related Art

As computers and networks become more proliferated, powerful, and affordable, a growing number of enterprises are using both to perform critical tasks and manage sensitive information. However, the convenience provided by computers and networks is leading to easy duplication and distribution of sensitive information. Often, multiple copies of documents containing sensitive information (hereinafter called "sensitive documents") find their way to endpoints of the network, for example in CD-ROMs, in memory sticks, and in other media. It is noted that sensitive document contains, for example, highly confidential information to which access is typically highly restricted.

The proliferation of information makes it harder to protect sensitive information, and gives people with malicious intent more opportunities to access such sensitive information and to leak it out to unintended parties. Industry researches generally indicate that leakage and theft of sensitive information causes more damage to organizations all over the world than security breaches by outsiders. Hence, leakage and theft of sensitive information presents a very significant security threat.

This information leakage problem is further highlighted by regulations such as the Sarbanes-Oxley Act. Besides the significant accounting and control requirements imposed on publicly owned companies, the Act created a new oversight board for accounting firms auditing publicly traded companies (PCAOB). The PCAOB established auditing standards, including Standard 2, which recognized that senior management cannot simply certify controls on the system. Rather, controls also have to track and manage the way financial information is generated, accessed, collected, stored, processed, transmitted, and used through the system. As a result, there are high demands for enterprise document management for protecting sensitive information.

One conventional approach to monitor and manage sensitive information in an enterprise network is to store highly sensitive information in a secured computer, accessible only to authorized personals, and closely manage and monitor accesses to the secured computer. When documents containing such information need to be duplicated or circulated, those seeking access typically follow secure administration procedures (or policies) to prevent unauthorized access. However, this approach is inadequate because the administration procedures are difficult to manage. Such procedures require extensive education and enforcement, and also can be quite costly to implement and monitor. Also, these procedures often are ineffective because it is cumbersome for people to review and modify the sensitive documents on the secured computer. Therefore, people tend to work on the secured documents in their own computers. However, once the sensitive documents leave the secured computer, the secured approach is no longer applicable, and the procedures become ineffective.

Another conventional approach to monitor sensitive information in an enterprise network is to monitor network traffic within the network. A network sniffer or monitor device is attached on a router within the network, and analyzes network traffic. Sensitive data content is then identified and filtered out by the network sniffer. This approach is inadequate in that it cannot analyze encrypted network traffic. For example, any network traffic using the Hyper Text Transfer Protocol (HTTP) over Secure Socket Layer (SSL) protocol is encrypted for security, and cannot be monitored for sensitive information. Also, because information inspection by the network sniffer takes time, data going through the router is slowed down, affecting the network performance.

Thus, there is a need for a system and method that provides a highly effective solution for users to monitor and manage sensitive information within an enterprise network.

SUMMARY

In certain embodiments of the present invention, users monitor and manage sensitive information within an enterprise network through a graphical user interface (GUI). The GUI provides users with static information, such as the presence of input/output devices (I/O device), the location of sensitive documents, and the status of local security policy. The GUI also provides users with dynamic information, such as the occurrence of security policy violations, the identity of sensitive documents entering and leaving an endpoint of the enterprise network, and their corresponding sensitivity levels.

In one embodiment, a scan agent is configured (or adapted) to conduct a security scan for sensitive documents stored in an endpoint and I/O devices attached (or connected) to the endpoint. The scan agent transmits the scan result to a GUI engine. The GUI engine generates an endpoint sensitive information view and an endpoint graphic I/O device view based on the information received. Based on the generated views, a GUI displays a static view of I/O devices and sensitive documents resided on the endpoint to a user. The user can manage the sensitive documents, configure local security policies, and conduct other activities affecting the endpoint through the GUI.

In another embodiment, a security agent is configured to detect sensitive documents being processed by an endpoint. The security agent transmits the information to a GUI engine. The GUI engine generates a real-time sensitive information flow view based on the information received. Based on the generated view, a GUI displays a dynamic sensitive information flow map of the endpoint to a user. The user can manage the sensitive documents and other aspects related to the data security of the endpoint through the GUI.

One advantage of the present invention is that it enables users to visually identify the location of sensitive information within a network so that the user can quickly assess the vulnerability of that sensitive information. The visualization of distributions of sensitive information, I/O devices (potential information leakage channels), and dynamic sensitive information flow gives users data security status of the enterprise network through visual representation. As a result, the users can easily identify and assess the vulnerability of sensitive information in the enterprise network, for example, with respect to intentional data theft and accidental leakage.

Another advantage is that users can detect the channels through which sensitive information is leaked as well as identify the involved parties. The dynamic sensitive information flow map tracks the sensitive information from its source to the endpoint where it leaves the enterprise network, so that users of the GUI can easily identify the information leakage channels and react accordingly to avoid further leakage. The dynamic sensitive information flow map also contains identity information of people accessing the sensitive information, so that users also can identify the parties involved in the information leakage.

These features are not the only advantages of the invention, nor will every embodiment necessarily contain all of these features or advantages. In view of the drawings, specification, and claims, many additional features and advantages will be apparent.

BRIEF DESCRIPTION OF THE DRAWINGS

The present invention has other advantages and features which will be more readily apparent from the following detailed description and the appended claims, when taken in conjunction with the accompanying drawings, in which:

Figure (FIG.) 1 is a block diagram illustrating an architecture for one embodiment of the present invention.

DETAILED DESCRIPTION

The Figures (FIGS.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

Generally, the disclosed embodiments describe a method and system to monitor and manage sensitive information in an enterprise network. This method and system identifies sensitive documents resided in endpoints of the network, identifies potential information leakage channels of the endpoints, detects sensitive information dynamic flow, and displays such information to users through a graphical user interface (GUI). The users can interact with the GUI to monitor and manage sensitive information in the network. It is noted that the disclosed embodiments can be applied to information other than sensitive information, such as internal information and other classifications of information. The information can be classified as sensitive information or internal information in a number of ways.

Architectural Overview

Figure 1:
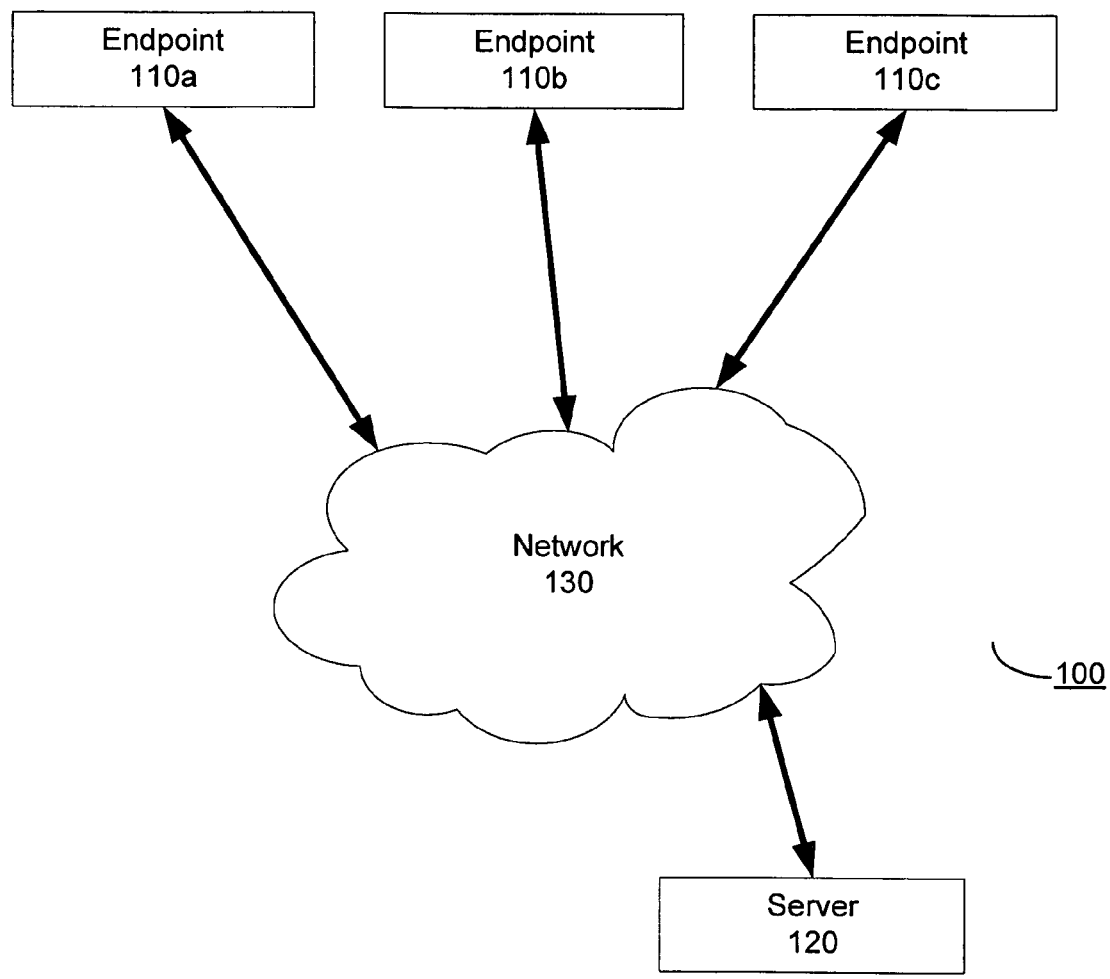

Referring now to FIG. 1, it illustrates an embodiment of an enterprise sensitive information management system 100 in accordance with the present invention. The system 100 monitors and manages sensitive information in an enterprise network. The system 100 includes endpoints 110a-c and a server 120. Each of the endpoints 110 can be a computer (e.g., laptop computers, desktop computers) or a device with data access capabilities (e.g., handheld computing devices, embedded devices with a processor and operating or control system). The server 120 is a computing device that functions as a central place of control for the system 100. The endpoints 110 and the server 120 are connected through a network 130. The network 130 may be a wired or wireless network. Examples of the network 130 include the Internet, an intranet, a cellular network, or a combination thereof. It is noted that each of the endpoints 110 and the server 120 are structured to include a processor, memory, storage, network interfaces, and applicable operating system and other functional software (e.g., network drivers, communication protocols, etc.).

Figure 2:
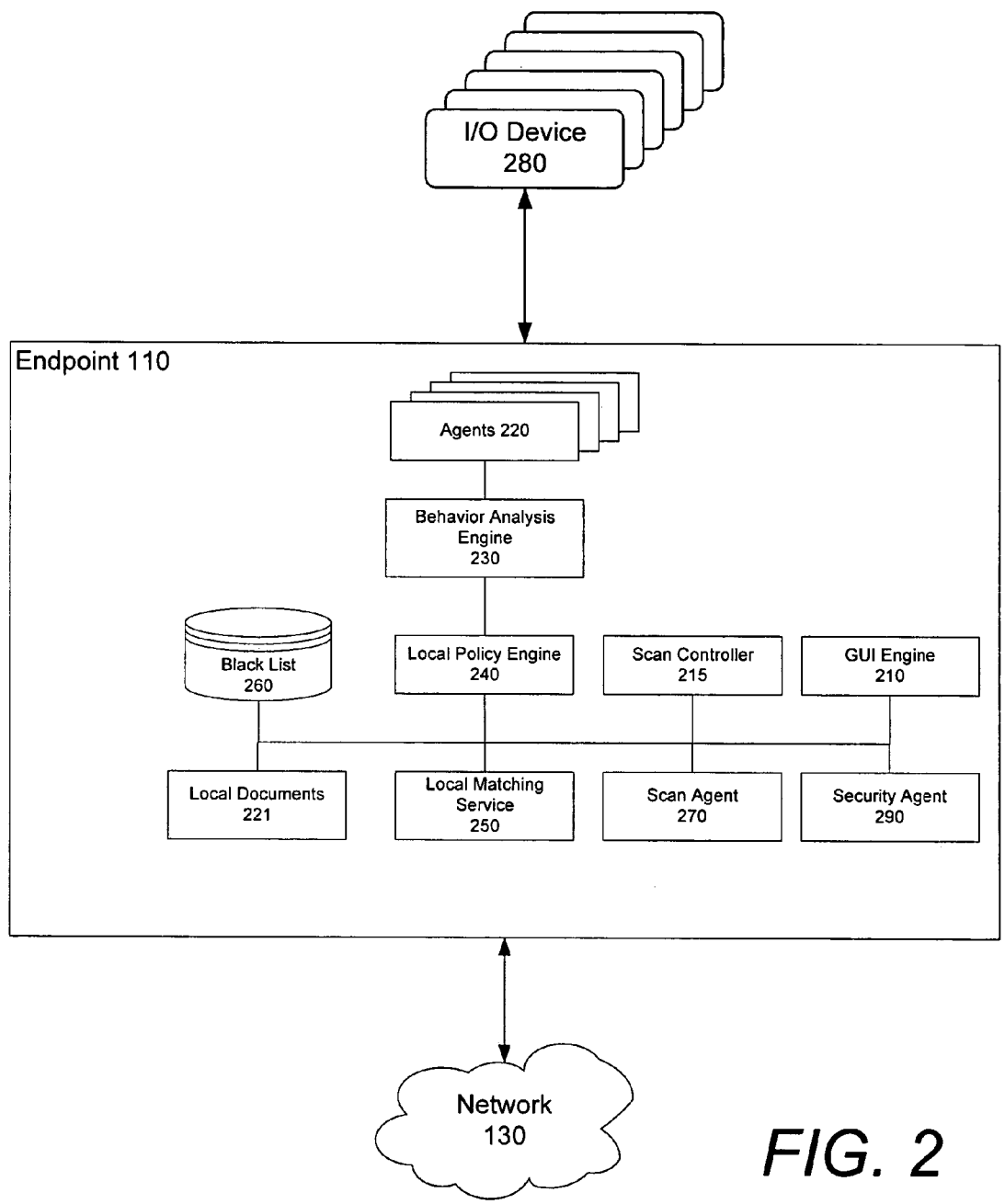
FIG. 2 is a block diagram illustrating the structure of an endpoint in accordance with one embodiment of the present invention.

Referring now to FIG. 2, it illustrates an embodiment of an endpoint 110 in accordance with the present invention. The endpoint 110 includes one or more agents 220, a behavior analysis engine 230, a local policy engine 240, a local matching service 250, a black list 260, a scan agent 270, a security agent 290, a scan controller 215, a GUI engine 210, and local documents 221. The endpoint 110 is also communicatively coupled to one or more I/O devices 280 and the network 140. The behavior analysis engine 230 communicatively couples the agents 220 and the local policy engine 240. The local policy engine 240, the local matching service 250, the scan agent 270, the security agent 290, the scan controller 215, and the GUI engine 210 are communicatively coupled via hardware and/or software to provide access to each other and to the local documents 221 and the black list 260.

The local documents 221 include all files residing on the storage of the endpoint 110. A sensitive document is a document containing sensitive information that has been classified by the user. Generally, it includes documents to which access or disclosure can be tightly restricted and/or managed. Different sensitive documents may have different sensitivity levels based on the sensitivity of their contents. For example, a company's accounting information may have a higher sensitivity level than the company's short term financial goal, even though both have sensitive information. The sensitivity level of a sensitive document can be set by authorized personnel or by some security policies. The local documents 221 can include both sensitive documents and documents that do not contain sensitive information.

The I/O devices 280 are peripheral devices attached to the endpoint 110 to transfer data into or out of the endpoint 110. Examples of the I/O devices 280 include network modems, wireless network cards, printers, floppy drives, CD/DVD ROM drives, USB drives, and other similar detachable devices. Note that sensitive information can be transferred out of the endpoint 110 through the I/O devices 280, and therefore, these devices are potential information leakage channels.

The one or more agents 220 are configured as software elements running at the endpoint 110 to perform one or more filtering functions. The agents 220, through application of its one or more filters, are configured to identify (or catch) documents in motion at the endpoint 110. Documents in motion are documents being presently processed by a particular endpoint 110. For example, a document being copied from a local hard disk of an endpoint 110 to a removable drive (e.g., thumb drive or portable disk drive) is considered a document in motion.

The behavior analysis engine 230 is configured to analyze the behaviors of all active applications in the endpoint 110. It can identify documents relevant to the document in motion identified by the agents 220. The behavior analysis engine 230 can also be configured to keep track and analyze certain user process activities captured by the agents 220, such as print/print-screen, copy/cut and paste, send via email, upload through network, save/save-as, and the like. It can identify user behaviors such as intentional scrambling of sensitive documents based on the current user process activity, the analysis, and a collection of activity-to-behavior patterns.

The local policy engine 240 is configured to contain security policies. The security policies define a set of restrictions on document access and control (e.g., limiting access or modification rights of certain sensitive documents to certain categories of users), device input/output (I/O) (e.g., prohibiting exportation of sensitive documents without encryption), and certain user behaviors (e.g., prohibiting duplicating the content of sensitive documents). The local policy engine 240 can also be configured to determine how a document is analyzed to detect sensitive information. In one embodiment, the security policies can be set and modified remotely by authorized personnel through a GUI generated by the GUI engine 210. The GUI engine 210 is described further below.

The black list 260 is a list of records associated with sensitive documents. It is intended to keep track of all sensitive documents detected by the local matching service 250. The black list 260 can be stored in a relational database or any other type of database, or even in a plain structured file. Each record holds information related to the associated sensitive document, for example, a file identifier (ID), a file full path name, and a sensitivity level (e.g., the level of sensitivity of the content of the associated document).

The local matching service 250 is configured to detect sensitive documents. The local matching service 250 can use a variety of matching techniques to detect sensitive documents, such as relevance detection matching, keyword matching, and named entity recognition matching. For example, relevance detection matching can be accomplished through content signatures generation and matching. Detailed description and embodiments of the content signatures can be found in U.S. patent application Ser. No. 11/361, 340, "Matching Engine With Signature Generation," filed on Feb. 24, 2006, the contents of which are hereby incorporated by reference. The local matching service 250 creates a record for each detected sensitive document and adds to the black list 260.

Additional embodiments and examples of the agent 220, the behavior analysis engine 230, the local policy engine 240, the black list 260, the local matching service 150, and a variety of matching techniques can be found in U.S. patent application Ser. No. 11/413,754 titled "Architecture Of Cascading Security Solution," by Fei Huang, et al., filed on Apr. 27, 2006, the contents of which are hereby incorporated by reference.

The scan agent 270 is configured to scan the endpoint 110 for static sensitive information. Static sensitive information is information about data security status of the endpoint 110 that tends to remain unchanged, such as the presence of I/O devices 280, the location of sensitive documents, and local security policies. The scan agent 270 scans local storage of the endpoint 110 for the local documents 221 and transmits the discovered local documents 221 to the local matching service 250 for sensitive information detection. The scan agent 270 also scans all devices connected to the endpoint 110 for the I/O devices 280. The scan agent 270 also can receive information about the local security policies from the local policy engine 240. In one embodiment, when the scan agent 270 receives a request for static sensitive information from an endpoint 110, it conducts a scan and returns the requested information to the endpoint 110.

Alternatively, the scan agent 270 conducts a complete scan for sensitive local documents and the I/O devices 280 periodically (e.g., once per day) and stores the resulting information in a local storage. When receiving a request for static sensitive information from an endpoint 110, the scan agent 270 only scans for documents that are modified or created after the previous complete scan, and transmits the scanned documents to the local matching service 250 for sensitive information detection. The scan agent 270 updates the result of the most recent scheduled scan by removing information about sensitive documents that are recently deleted and inserting or modifying information about sensitive documents that are recently created or modified, and returns the updated information. Because I/O operations can be time consuming, the scan agent 270 can respond to requests more promptly by not conducting a complete scan.

The security agent 290 is configured to identify dynamic sensitive information. Dynamic sensitive information is information related to the sensitive information being processed in the endpoint 110, such as the occurrence of local security policy violations, the identities of sensitive documents entering and leaving the endpoint 110, and information about users of the endpoint 110. The security agent 290 can receive such information from the local policy engine 240. The security agent 290 can transmit the dynamic sensitive information to a central security engine in real-time, forming an endpoint sensitive information flow. In one embodiment, the functions of the security agent 290 can be implemented in the local matching service 250.

Referring again to the GUI engine 210, it is configured to provide users with an interface to monitor and manage sensitive information within the system 100. In one embodiment, the interface is a graphical user interface (GUI) that is configured to display text, graphics, and/or images (still or motion). The GUI comprises one or more views visualizing the distribution of sensitive information within the system 100 and the data security status of the endpoints 110. In some embodiments, the GUI engine 210 receives information about the distribution of sensitive information and I/O devices from the scan agents 270 of one or more endpoints 110. The GUI engine 210 also receives the dynamic sensitive information flows from a central security engine. The central security engine is further described below.

Based on the information received, the GUI engine 210 is configured to construct and maintain an endpoint information view for each endpoint 110. Each endpoint information view comprises an endpoint graphic I/O devices view, an endpoint sensitive information view, and a real-time sensitive information flow view. The endpoint graphic I/O devices view includes information about the I/O devices connected to the corresponding endpoint 110. Examples of such information include names of the devices, types of the device, and duration of a connection of that device. The endpoint sensitive information view includes information about sensitive documents stored in the corresponding endpoint 110. Examples of such information of a sensitive document include its name, its location, and its assigned sensitivity level. The real-time sensitive information flow view includes information about sensitive documents being processed by the corresponding endpoint 110. Examples of such information include the document being processed, type of processing, and current user.

In some other embodiments, a central GUI engine receives information about the distribution of sensitive information and I/O devices and the dynamic sensitive information flow. The central GUI engine also constructs and maintains the endpoint information view for each endpoint 110 based on the information received. The GUI engine 210 of each endpoint 110 accesses the endpoint information views residing (or stored) in the central GUI engine. An advantage of this configuration is that only the central GUI engine constructs and maintains the endpoint information views, thus, offloading the same processing from the GUI engine 210. A GUI engine 210 only needs to access the central GUI engine for the necessary information to provide users with the GUI, therefore can save the resources which are otherwise necessary to construct and maintain the endpoint information views. The central GUI engine can be continuously executing so that all information in the endpoint information views is kept updated. Therefore, a GUI engine 210 can access information about the distribution of sensitive information and I/O devices and the dynamic sensitive information flow of target endpoints 110 directly from the central GUI engine; it need not to wait for the scan agents 270 to scan the target endpoints 110.

The GUI engine 210 generates the GUI based on the endpoint information views. In one embodiment, the generated GUI is a web based management console. The GUI can include a summary view, a topology view, an endpoint view, and a security alarm view. The views are rendered for display on a screen in one or more application windows. In one embodiment, a summary view (also known as data security summary view) uses graphical formats (e.g., list, bar chart, pie chart, etc.) to show the data security summary of endpoints in an organization. Data shown in the summary view can include total number of high risk endpoints in the system 100 and their risk levels, total number of sensitive documents and their sensitivity levels, total number of endpoints scanned, total number of removable storage devices attached to endpoints, etc.

The risk level (also known as data security level) of an endpoint 110 can be determined based on security policies defined by system administrator and sensitive information (both static and dynamic) of the endpoint 110, such as the number of I/O devices 280 attached, the number of sensitive documents resided. It is noted that in determining the risk level of an endpoint 110, two sensitive documents can carry different weight based on their sensitivity level (e.g., a sensitive document with higher level sensitivity level carries more weight than a sensitive document with a lower level sensitivity level).

Figure 8:
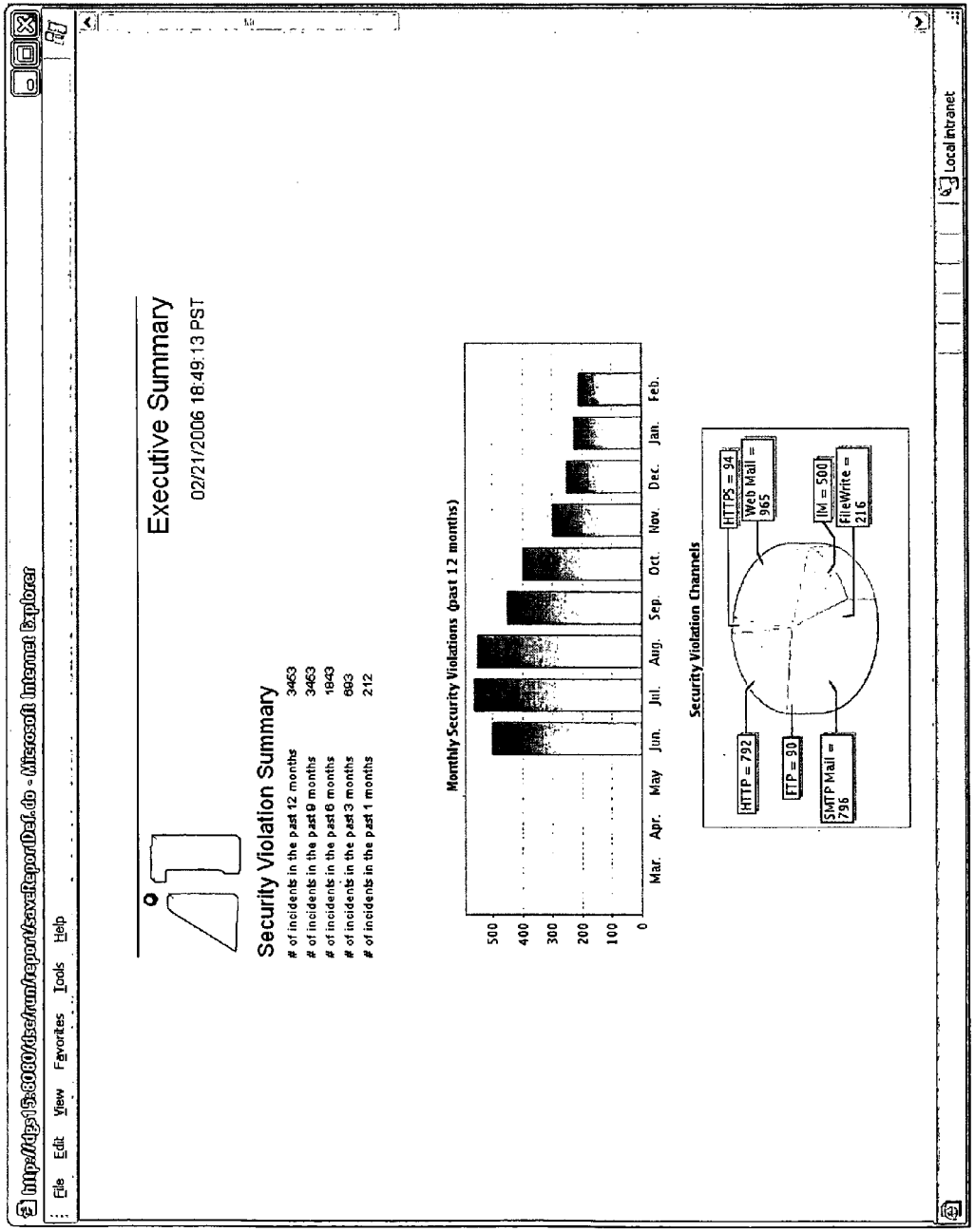

One example of the summary view is illustrated in FIG. 8. In the example shown in FIG. 8, the summary view lists the number of security violations in the past 12 months, 9 months, 6 months, 3 months, and 1 month. The summary view also displays the number of security violations for the past 9 months in a bar chart and the security violation channels associated with the violations in a pie chart. Thus a user (e.g., an administrator) is presented with an easy-to-use-and-read representation of summarized security information corresponding to sensitive documents within a network.

A topology view (also known as data security network map, map view) shows the data security status of scanned endpoints 110 in the context of the system 100. For example, the scanned endpoints can be shown as an icon in a chart showing the physical or logical layout of the endpoints 110 in the system 100. The icons representing endpoints 110 can be represented by a visual characteristic such as color or patterns. For example, an endpoint may be color-coded representing different data security levels (e.g., color red indicates that the endpoint 110 represented is insecure, color yellow indicates warning, and color green indicates that the endpoint 110 is secure) or can be represented with other visual characteristics (e.g., use of patterns such as dots and stripes). The visual characteristics (e.g., color or pattern) for an icon can be updated in real-time based on the dynamic security information collected from the associated endpoint 110.

Figure 7:
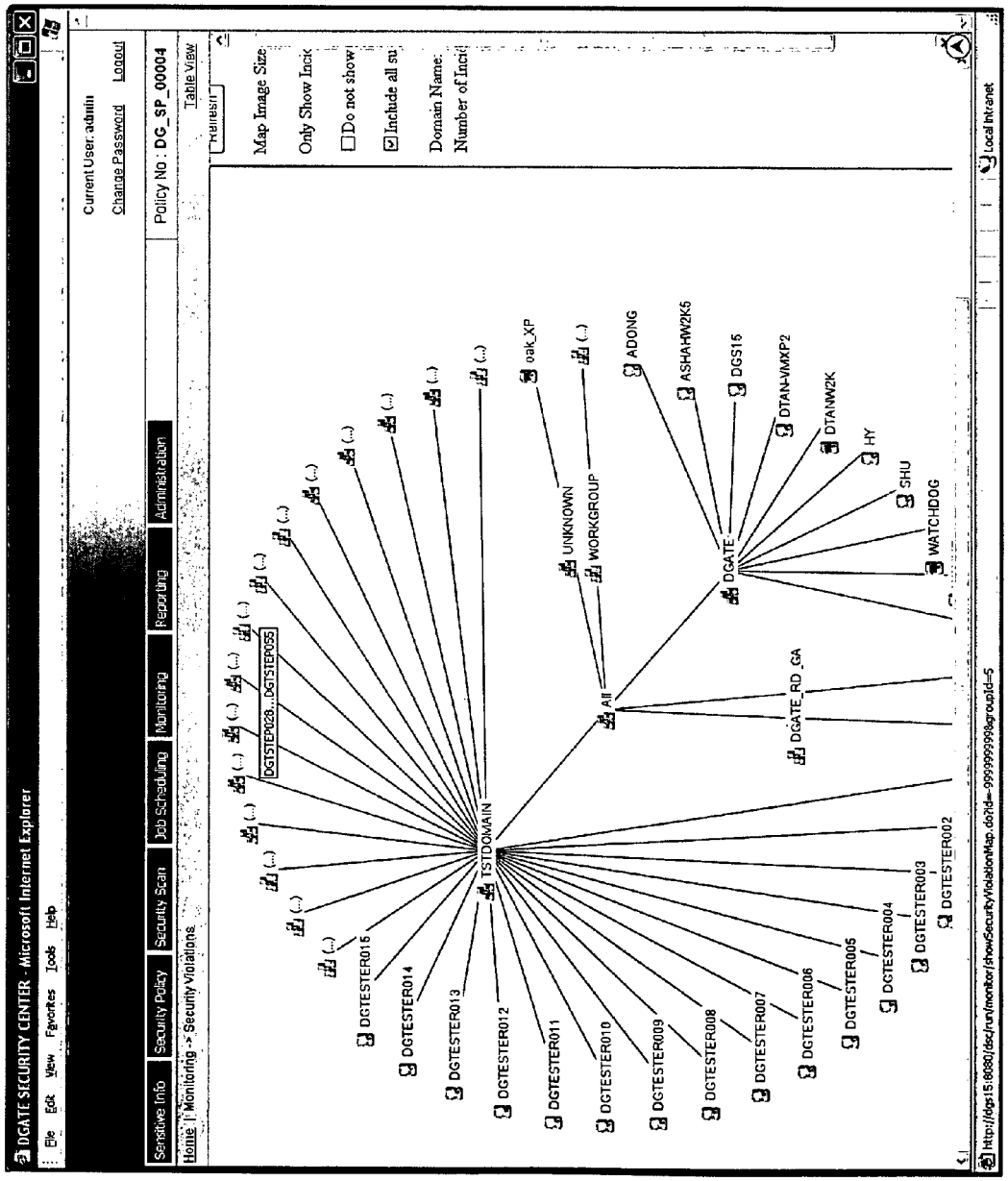
FIGS. 7-9 are screen shots depicting examples of graphical user interface, in accordance with one embodiment of the present invention.

One example of the topology view is illustrated in FIG. 7. In FIG. 7, the topology view uses an icon of a desktop computer to represent an individual endpoint 110 and an icon of three computers to represent a collection of endpoints 110. For example, an endpoint (or a collection of endpoints) with high security risk is represented by an icon having a first visual characteristic (e.g., dark gray), an endpoint with low or no security risk is represented by an icon having a second visual characteristic (e.g., light gray), and an endpoint with medium security risk is represented by an icon having a third visual characteristic (e.g., medium gray). It is noted that the icons can use other visual characteristics (e.g., patterns) to illustrate the different security risk levels of the endpoints being represented.

In another embodiment, the GUI engine 210 can display a track of a sensitive document specified by the user on a topology view such that users can monitor and visualize the path of movements of the sensitive document. The view can highlight on the network topology with the endpoint/server where the sensitive document originates, where the sensitive document visits, and where it leaves the system 100. The view can also indicate the identity of the users involved (e.g., the active user of the endpoint where the sensitive documents left the system 100 and when it left the system 100) and the channel involved (e.g., the identity of the I/O device through which the sensitive document left the system 100). Users can use the view to determine and/or identify how the sensitive information leaked out of the system 100. The GUI engine 210 can aggregate the information received for the necessary information to generate a view tracking the sensitive document. For example, the GUI engine 210 received the following information: (1) user A logged into endpoint X at 5:00pm, (2) user A copied a sensitive document D to endpoint Y as a document D', (3) user B logged into endpoint Y at 6:00pm, (4) user B emailed the document D' to an email exchange server outside the system 100. Based on the above information, the GUI engine 210 can construct a view indicating that endpoint X is the source of the document D, which traveled to endpoint Y, and left the system 100 via a network connection.

An endpoint view (or endpoint computer view) provides detailed information of data security status of an endpoint 110 specified by a user. The view is configured to list all I/O devices 280 attached to that endpoint 110 and display a list of sensitive documents residing at that endpoint 110. It also displays sensitivity levels associated with each of the listed sensitive documents. It can display the security policy in effect in the endpoint 110. The view also may provide real-time information of sensitive document being processed by the endpoint 110.

In one embodiment, the endpoint can be displayed (or visualized) as a drawing of a computer system having illustrated components that are internal and/or external to that endpoint. For example, the endpoint may be illustrated as a desktop computer system with icons or graphics illustrating I/O devices within a chassis where data and/or security leaks could occur. For example, the icons or graphics may represent I/O devices including network interface cards, USB drives, CD/DVD ROM drives, and printers. Also, the icons or graphics illustrating the I/O devices can change characteristics (e.g., color, pattern, or sound) as security issues occur or change. Further, by way of example, the endpoint may also show external I/O devices represented by icons or graphics surrounding the computer system.

Figure 9:
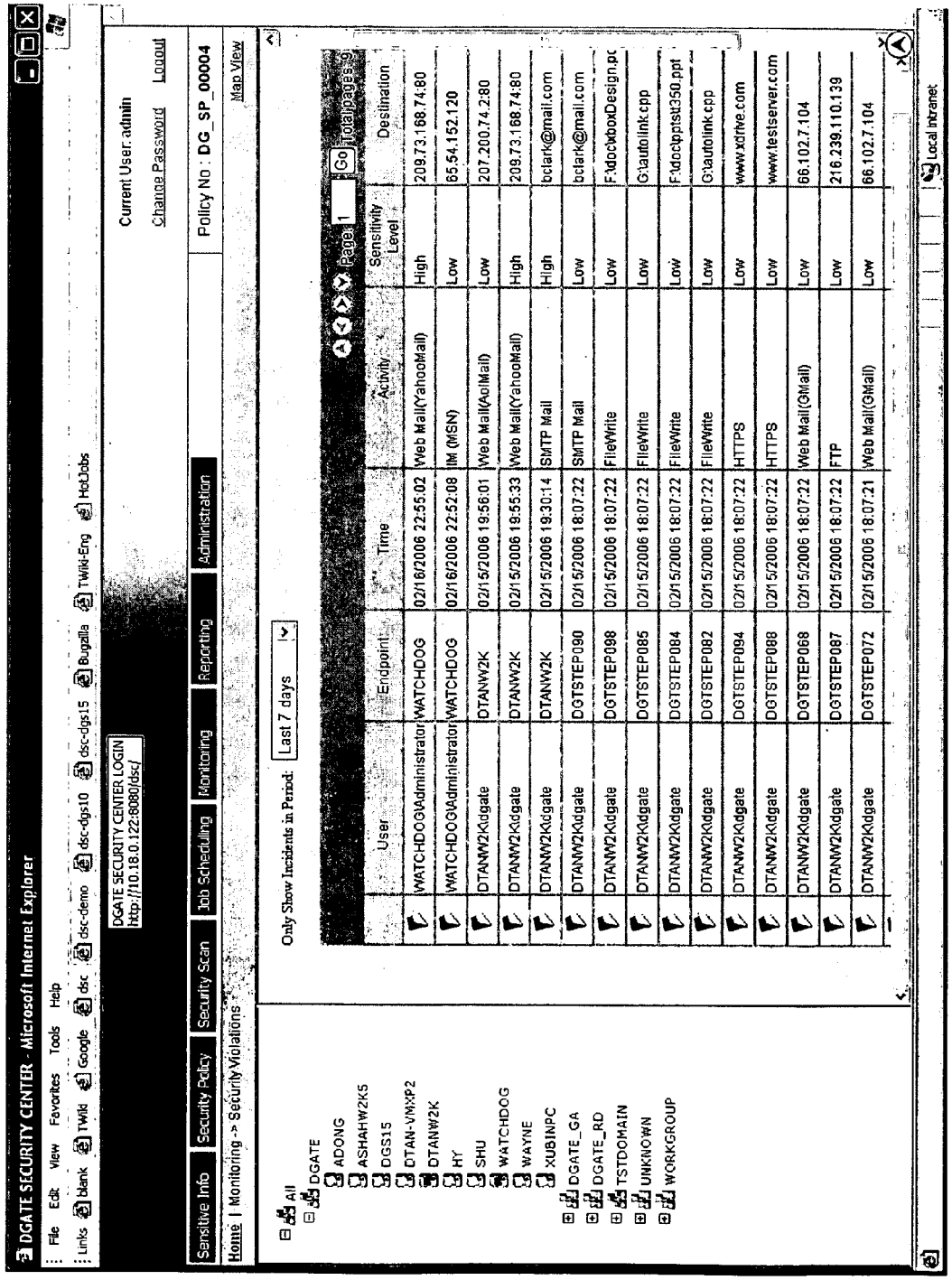

A security alarm view provides information regarding potential information leakage points of the system 100. The security alarm view is configured to raise alarm and alert regarding sensitive information access violation at endpoints 110 based on security policies in effect. A sensitive information access violations occurs when the number of sensitive files leaving the endpoint 110 (e.g., through FTP, copied to USB devices, CD/DVD disk, by email) exceeds a threshold. One example of the security alarm view is illustrated in FIG. 9. The example view in FIG. 9 lists a list of security of violations of a system 100 during the most recent 7 days and their related information.

The GUI can receive a user (e.g., an administrator) input and pass on the input to the GUI engine 210. The GUI can receive input through a keyboard, a mouse, or other input devices connected to the endpoint/server where the GUI engine 210 resides. The GUI engine 210 is configured to receive inputs from the users and respond correspondingly. For example, the user can request the GUI to switch to a different view of the system 100 by clicking an icon in the GUI representing the different view. Alternatively, the user can request the GUI to drill down from a topology view to any endpoint 110 in the system by double clicking the icon representing the endpoint 110, and view detailed information relevant to the endpoint's security status. The user also can request to drill down on a sensitive document by clicking on the sensitive document to view detailed tracking information of the document. The user also can request an endpoint to change its behavior in real-time, such as to upgrade or downgrade its local security policy, to manually interrupt an operation, or to disconnect an I/O device 280. The user also can set up some automatic system setting, such as if the number of security violation of an endpoint 110 exceeds a threshold, the endpoint 110 is automatically shut down or disconnected from the network 130.

The scan controller 215 is configured to receive a user request to scan endpoints and pass the request to the corresponding endpoints. The scan controller 215 receives the user request through the GUI engine 210. The request can be for all the endpoints in the system 100 or only a portion thereof. The request can be about the sensitive local documents, the I/O devices 280, the local security policy, and other similar information. The scan controller 215 can route the request to a central scan engine, which will be describe in more detail later in this application. Alternatively, the scan controller 215 can route the request directly to each of the corresponding endpoints.

In one embodiment, the server 120 includes a central scan engine (not shown), a central security engine (not shown), and a central GUI engine (not shown). The server 120 (which may be one or more computing systems structured to function as described herein) functions as a central place of control for the system 100. It is noted that the server 120 is located separately from an endpoint 110, but it also can reside within the same machine so that the machine functions both as the endpoint 110 and the server 120 in the enterprise network.

The central GUI engine is configured to construct and maintain endpoint information views. Endpoint information views are described in detail earlier when describing GUI engine 210. The central scan engine receives information about the distribution of sensitive information and I/O devices from the scan agent 270 of each scanned endpoint 110 and the dynamic sensitive information flow from a central security engine. As mentioned above, by keeping the central GUI engine up and running constantly, each individual GUI engine 210 does not need to construct and maintain endpoint information views, and the GUI engine 210 need not wait for the scan agents 270 to scan the target endpoints 110.

The central security engine is configured to route the endpoint sensitive information flow to the corresponding GUI engine 210. If central GUI engine is provided, the central security engine routes the endpoint sensitive information flow to the central GUI engine instead. In some embodiments, the endpoint information flow the central security engine receives includes both sensitive information flow and non-sensitive information flow. The central security engine filters out the non-sensitive information flow received and passes on the sensitive information flow to the GUI engine 210.

The central scan engine is configured to route the scan request from a scan controller 215 to the right target endpoints. The central scan engine has access to an updated list of all endpoints 110 in the system 100 and their corresponding addresses. The central scan engine interprets the request from the scan controller 215 and forwards the request to the corresponding target endpoints. For example, if the user requests for a topology view of the system 100, the scan controller 215 sends such a request to the central scan engine, and the central scan engine forwards the request to each endpoint 110 of the system 100.

It is noted that the central scan engine, the central security engine, and the central GUI engine can be configured on one or more conventional computing systems having a processor, memory, storage, network interfaces, peripherals, and applicable operating system and other functional software (e.g., network drivers, communication protocols, etc.). In addition, it is noted that the agent 220, the behavior analysis engine 230, the local policy engine 240, the local matching service 250, the scan agent 270, the security agent 290, the scan controller 215, and the GUI engine 210 are logically configured to function together and can be configured to reside on one physical system or across multiple physical systems.

Methodology Overview

1. Static View

Figure 5:
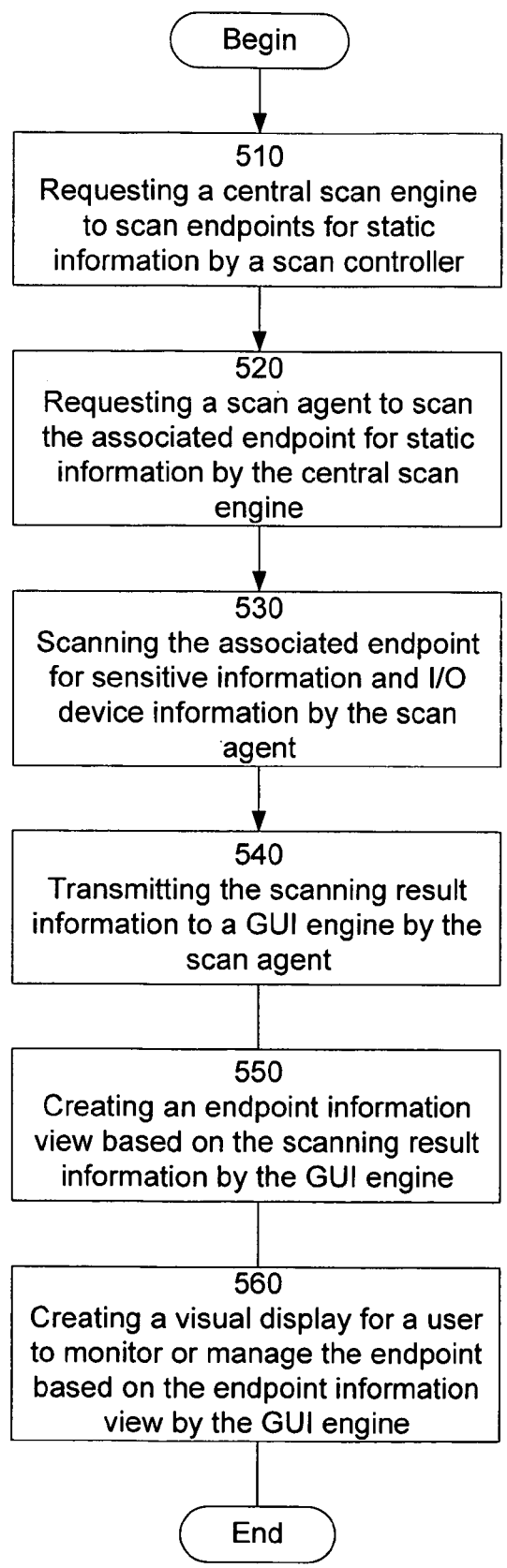
FIG. 5 is a flowchart of an exemplary process for displaying static sensitive information, in accordance with one embodiment of the present invention.

Referring now to FIG. 5, there is shown a flowchart of an exemplary process for displaying static sensitive information according to one embodiment of the present invention. The process illustrated in FIG. 5 may be implemented in software, hardware, or a combination of hardware and software.

Figure 3:
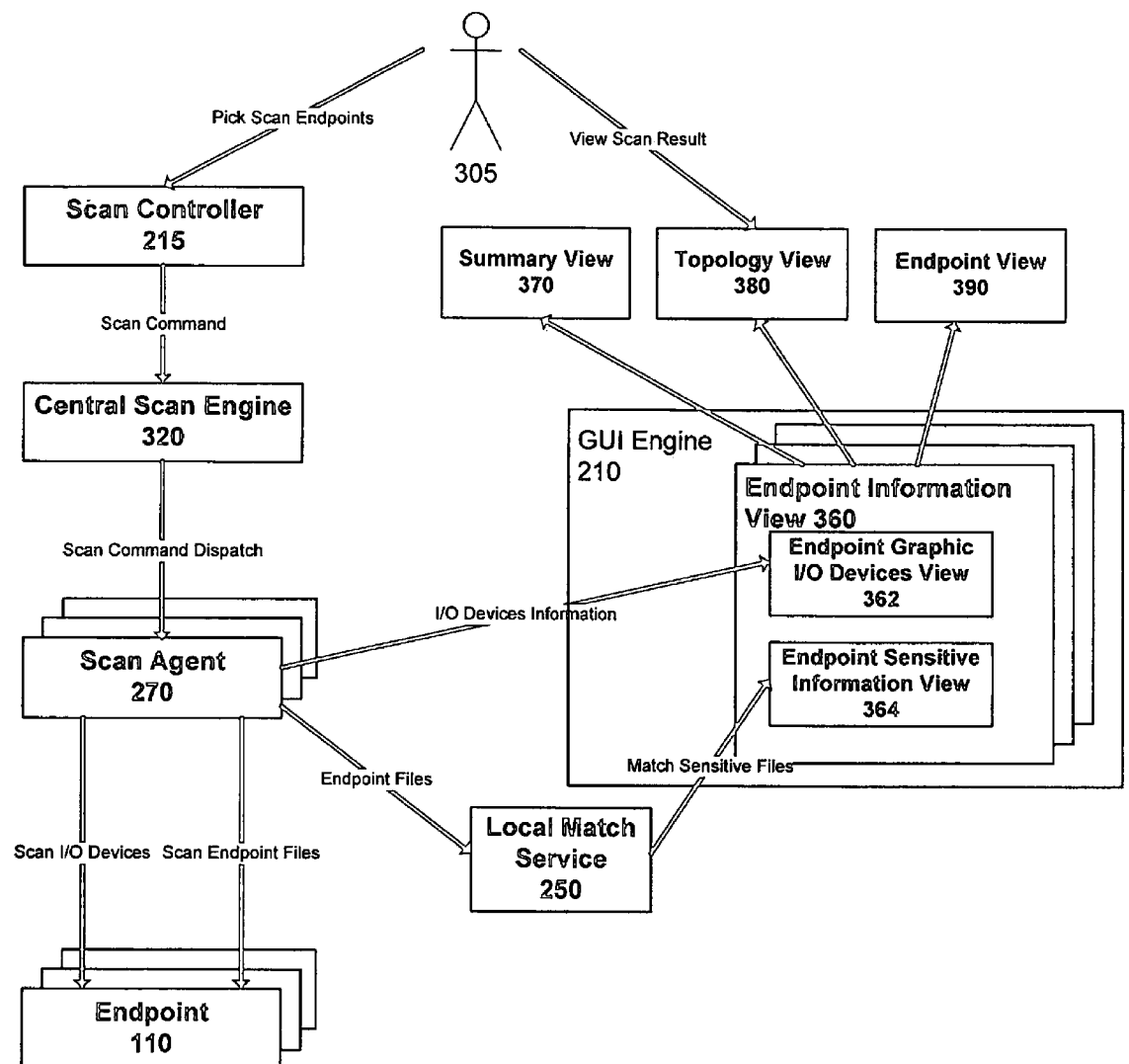
FIG. 3 is an exemplary architecture for displaying static sensitive information, in accordance with one embodiment of the present invention.

The flowchart shown in FIG. 5 will now be described in detail. For ease of discussion, FIG. 5 will be described with reference to the example architecture illustrated in FIG. 3. The process commences with an authorized user 305 requesting a view of the static sensitive information. For example, the user 350 may request the GUI engine 210 to display an endpoint view of an endpoint 110 by clicking the icon representing the endpoint 110 in a topology view of the system 100. The GUI engine 210 converts the user's demand into a request to scan the target endpoint 110 and passes the demand to the scan controller 215.

The scan controller 215 requests 510 the central scan engine 320 to scan target endpoints for static sensitive information. It is noted that in order for the scan agent 270 to transmit the static sensitive information to the corresponding GUI engine 210, the scan controller 215 can also provide information about the GUI engine 210 to the central scan engine 320.

For each target endpoints 110, the central scan engine 320 request the scan agent 270 of the target endpoint 110 for static sensitive information of the target 110. Because the central scan engine 320 has access to a complete up-to-date list of endpoints 110 in the system 100 and their associated addresses, the central scan engine 320 can correctly transmit the requests to the intended target endpoint 110 through the network 130. It is noted that in some embodiments, the central scan engine 320 may be optional, and the scan controller 215 can transmit the request directly to the scan agents 270 of the target endpoints 110.

The scan agent 270 scans 530 the associated target endpoint 110 for sensitive information and I/O device information. The scan agent 270 scans 530 local documents 221 residing at the target endpoint 110 and sends to the local match service 250 for sensitive information detection. The scan agent 270 also scans 530 for I/O devices connected to the target endpoint 110 that potentially can allow sensitive information to leave the target endpoint 110. In one embodiment, the scan agent 270 also scans 530 the memory of the target endpoint 110 for sensitive information. As described earlier, assuming there is a central GUI engine, the request would be from the central GUI engine, not the central scan engine 320. The scan agent 270 may also conduct complete scan periodically and only scan the local documents 221 that are modified or newly created between the complete scans.

The scan agent 270 transmits 540 the resulting information to the GUI engine 210 originating the request. The GUI engine 210 creates 550 an endpoint information view 360 for each of the target endpoints based on the information received from the scan agent 270. As described earlier, an endpoint information view 360 includes an endpoint graphic I/O devices view 362 and an endpoint sensitive information view 364. The GUI engine 210 uses information received from the scan agent 270 regarding I/O devices connected to the target endpoint to create or update the content of the endpoint graphic I/O devices view 362 associated with the target endpoint 110. The GUI engine 210 uses information regarding sensitive documents residing in the target 110 to update the endpoint sensitive information view 364. As described earlier, if a central GUI engine is used, it receives the information from the scan agent 270 and creates 550 and maintains endpoint information views 360 for endpoints 110.

The GUI engine 210 creates (or renders) 560 a visual display for the user to monitor or manage the target endpoints based on the endpoint information view 360. In one embodiment, the visual display is a web based management console.

As described earlier, the user 305 can interact with the created visual display to select one or more views or to manage the target endpoint 110 (e.g., upgrade or downgrade the local security policies).

2. Dynamic View

Figure 4:
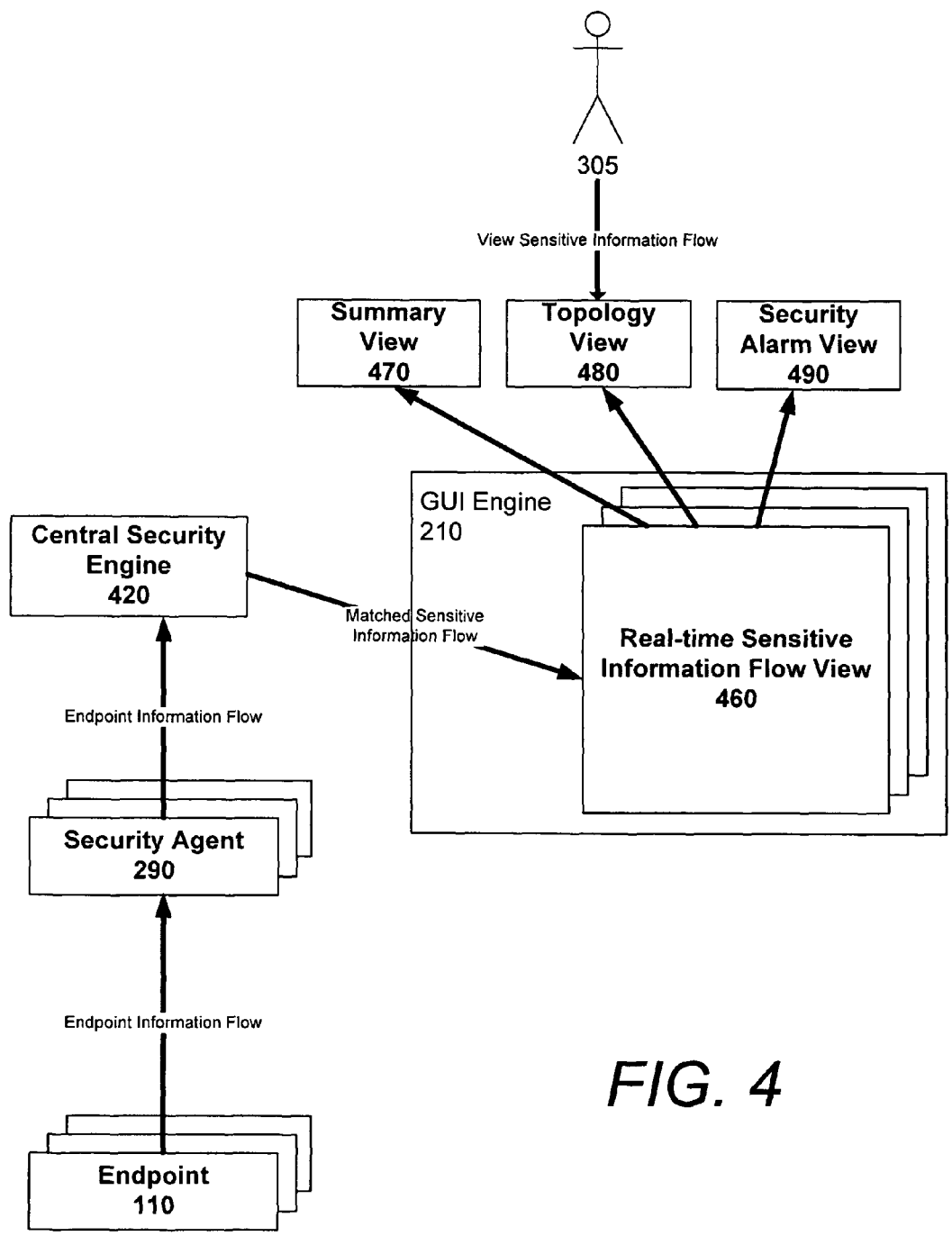
FIG. 4 is an exemplary process for displaying dynamic sensitive information, in accordance with one embodiment of the present invention.
Figure 6:
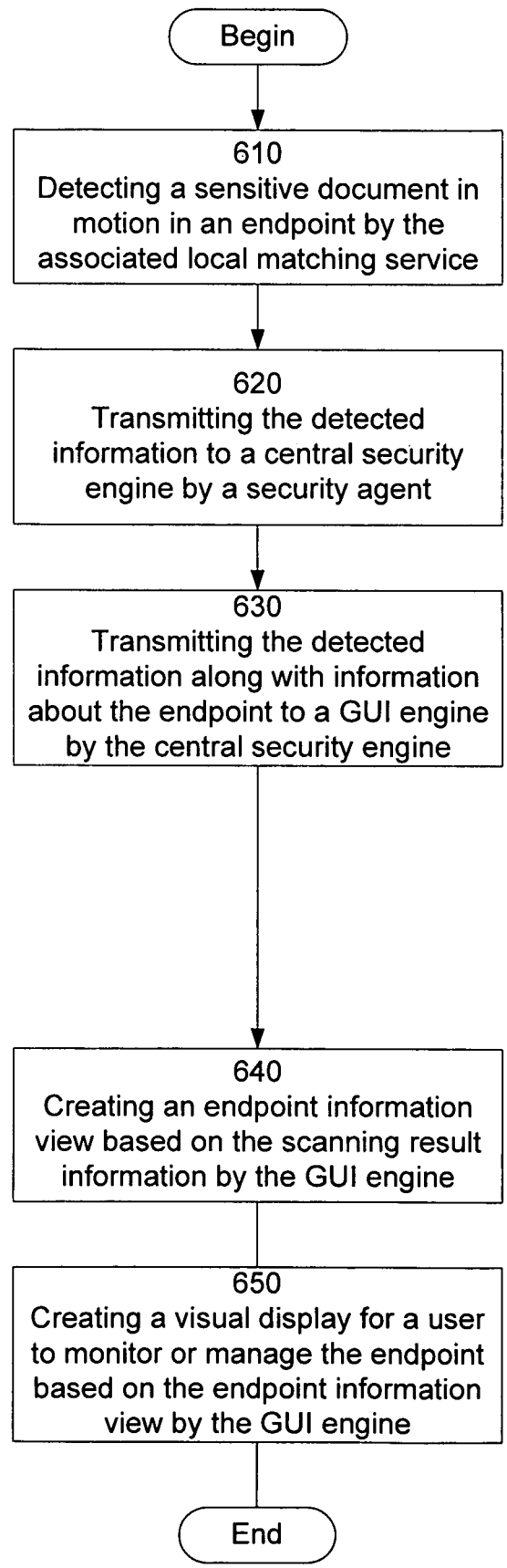
FIG. 6 is a flow chart of an exemplary process for displaying dynamic sensitive information, in accordance with one embodiment of the present invention.

Referring now to FIG. 6, there is shown a flowchart of an example process for displaying dynamic sensitive information according to one embodiment of the present invention. The process illustrated in FIG. 6 may be implemented in software, hardware, or a combination of hardware and software. The flowchart shown in FIG. 6 will now be described in detail. For ease of discussion, the process will be described with reference to the example architecture illustrated in FIG. 4.

The security agent 290 of an endpoint 110 detects 610 a sensitive document in motion in the endpoint 110. A document in motion is a document being presently processed by the endpoint 110. An agent 220 detects the document in motion and transmits it to the local matching service 250 to determine whether the document is a sensitive document. If the document in motion is determined to be a sensitive document, the local matching service 250 notices the security agent 290 of information about the document. The local policy engine 240 also notices the security agent 290 of information about the local activities that violates the local security policies (hereinafter called "security violation").

The security agent 290 transmits 620 a sensitive endpoint information flow to a central security engine 420. The sensitive endpoint information flow comprises the information collected by the security agent 290, such as information about the security violations, information about the sensitive document in motion, information about the I/O device 280 changes (e.g., newly added/removed I/O devices), and information about the current users of the endpoint 110 (e.g., the user who is operating the endpoint, either remotely or on site).

The central security engine 420 transmits the sensitive endpoint information flow to the GUI engine 210 of the endpoint 110 where the user 305 operates. In some embodiments, the security agent 290 transmits 620 information about all documents in motion, instead of information only about the sensitive documents in motion. The central security engine 420 applies some matching techniques as described earlier to determine whether the documents in motion are sensitive documents and the corresponding sensitivity levels. The central security engine 420 then transmits only information about the sensitive document in motion to the GUI engine 210.

The GUI engine 210 creates 640 an endpoint information view 360 for each of the target endpoints based on the information received from the central security engine 420. As described earlier, an endpoint information view 360 includes a real-time sensitive information flow view 460. The GUI engine 210 uses information received from the central security engine 420 to create and update the content of the real-time sensitive information flow view 460. As described earlier, if a central GUI engine is used, then the central GUI engine receives the information from the central security engine 420 and creates 550 endpoint information views 360.

The GUI engine 210 creates (or renders) 650 a visual display for a user to monitor or manage the endpoints based on the endpoint information views. In one embodiment, the visual display is a web based management console. As described earlier, the user 305 can interact with the created visual display.

One advantage of the present invention is that it enables users (e.g., administrators) to visually identify the location of sensitive information within a network so that the user can quickly assess the vulnerability of that sensitive information. The visualization of distributions of sensitive information, I/O devices (potential information leakage channels), and dynamic sensitive information flow gives users data security status of the enterprise network through visual representation. As a result, the users can easily identify and assess the vulnerability of sensitive information in the enterprise network, for example, with respect to intentional data theft and accidental leakage.

Another advantage is that users can detect the channels through which sensitive information is leaked as well as identify the involved parties. The dynamic sensitive information flow map tracks the sensitive information from its source to the endpoint where it leaves the enterprise network, so that users of the GUI can easily identify the information leakage channels and react accordingly to avoid further leakage. The dynamic sensitive information flow map also contains identity information of people accessing the sensitive information, so that users also can identify the parties involved in the information leakage.

Various embodiments may be implemented using one or more hardware elements (e.g., the machines running the system described). In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments (e.g., the processes described) may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations. The software may be written or coded using a programming language. Examples of programming languages may include C, C++, BASIC, Perl, Matlab, Pascal, Visual BASIC, JAVA, ActiveX, assembly language, machine code, and so forth.

The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Further, some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

Moreover, some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a system and a process for document management and sensitive information leakage prevention through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method to monitor and control a network, the network comprising a plurality of endpoints, each of the plurality of endpoints comprising a plurality of sensitive documents, a security policy, and a plurality of I/O devices, the method comprising:
    scanning and retrieving security information from a first endpoint of the plurality of endpoints, the security information comprising information about the plurality of sensitive documents, the security policy, and the plurality of I/O devices, the scanning conducted at predefined intervals;
    responding to a user input, displaying a data security summary view listing a number of security violations over multiple time periods;
    responding to a user input, graphically displaying a topology view which graphically displays a track of a sensitive document by highlighting an endpoint or server where the sensitive document originates, where the sensitive document visits, and where the sensitive document leaves the network;
    responding to a user input, displaying a security alarm view which raise an alert when a number of sensitive files leaving an endpoint exceeds a threshold, determining whether a document is a sensitive document by matching a content of the document with prestored content identified as sensitive; and
    aggregating tracing information of a sensitive document based on the security information from one or more of the plurality of endpoints.

2. The method of claim 1, wherein the security information comprises static sensitive information and dynamic sensitive information,
    the static sensitive information comprising at least one selected from a group of:
        information about documents containing the sensitive information residing in the first endpoint,
        information about I/O devices connected to the first endpoint, and
        information about the security policies in the first endpoint,
    the dynamic sensitive information comprising at least one selected from a group of:
        information about current users of the first endpoint, and
        information about sensitive documents in motion.

3. The method of claim 2, wherein retrieving security information further comprising:
    transmitting a request to the first endpoint; and
    receiving static sensitive information and dynamic sensitive information from the first endpoint.

4. The method of claim 2, wherein retrieving security information further comprising:
    receiving static sensitive information periodically;
    transmitting a request to the first endpoint; and
    receiving dynamic sensitive information and updating static sensitive information from the first endpoint, the updating static sensitive information describing the static sensitive information changes in the first endpoint comparing to the most recently received static sensitive information.

5. The method of claim 1, wherein the security alarm view comprises at least one selected from a group of: list, bar chart, and pie chart.

6. The method of claim 1, further comprising:
    responding to a user input, conducting at least one operation selected from a group of:
        modifying the security policies in the first endpoint;
        disconnecting one of the plurality of I/O devices from the first endpoint;
        disconnecting the first endpoint from the network access;
        interrupting an operation in the first endpoint, the operation being related to one of the plurality of sensitive documents; and
        shutting down the first endpoint.

7. The method of claim 1, wherein the topology view is displayed as a visualization of the endpoint or server where the sensitive document originates.

8. The method of claim 1, wherein the first endpoint comprises fixed storage and removable storage.

9. A non-transitory computer-readable tangible medium storing program instructions configured to implement a network sensitive information management system for monitoring and controlling sensitive information in a network, the network comprising a plurality of endpoints, each of the plurality of endpoints comprising a plurality of sensitive documents, a security policy, and a plurality of I/O devices, the computer-readable tangible medium comprising:
    a scan module comprising computer-readable instructions stored in the non-transitory computer-readable tangible medium which are configured to scan the plurality of endpoints and retrieve security information, the security information comprising information about the plurality of sensitive documents, the security policy, and the plurality of I/O devices, the scanning conducted at predefined intervals;
    a match module comprising computer-readable instructions stored in the non-transitory computer-readable tangible medium which are configured to determine whether a document is a sensitive document by matching a content of the document with prestored content identified as sensitive;
    a trace module comprising computer-readable instructions stored in the non-transitory computer-readable tangible medium which are configured to aggregate tracing information of a sensitive document based on the security information from one or more of the plurality of endpoints; and
    a graphical user interface module comprising computer-readable instructions stored in the non-transitory computer-readable tangible medium which are configured to generate a plurality of views including:
        a data security summary view listing a number of security violations over multiple time periods;

a topology view which graphically displays a track of a sensitive document by highlighting an endpoint or server where the sensitive document originates, where the sensitive document visits, and where the sensitive document leaves the network; and a security alarm view which raise an alert when a number of sensitive files leaving an endpoint exceeds a threshold.

10. An apparatus for monitoring sensitive information in a network, the network comprising a plurality of endpoints, each of the plurality of endpoints comprising a plurality of sensitive documents, a security policy, and a plurality of I/O devices, the apparatus comprising:

a computer system including a monitor configured to display objects and characters; and an executable process running on the computer system, the executive process scanning and receiving user input, receiving security information from one of the plurality of endpoints, and generating a plurality of views including a data security summary view listing a number of security violations over multiple time periods, a topology view which graphically displays a track of a sensitive document by highlighting an endpoint or server where the sensitive document originates, where the sensitive document visits, and where the sensitive document leaves the network based on aggregated tracing information of a sensitive document based on the security information from one or more of the plurality of endpoints, and a security alarm view which raise an alert when a number of sensitive files leaving an endpoint exceeds a threshold, wherein the sensitive document is identified by matching a content of the document with prestored content identified as sensitive, wherein the security information comprising information about the plurality of sensitive documents, the security policy, and the plurality of I/O devices, the scanning conducted at predefined intervals.

11. The apparatus of claim 10, wherein the plurality of views further include an endpoint view which provides real-time information of a sensitive document being processed by the endpoint.

12. The apparatus of claim 10, wherein the executable process responds to a user input to drill down on an endpoint by displaying detailed information relevant to the endpoint's security status.

13. The apparatus of claim 10, wherein the executable process responds to a user input to drill down on a sensitive document by displaying detailed tracking information of the document.

14. The apparatus of claim 10, wherein the executable process is configured such that, if a number of security violations at an endpoint exceeds a threshold, then the endpoint is automatically disconnected from the network.

* * * * *